United States Patent [19]

Obara et al.

[11] 4,274,874
[45] Jun. 23, 1981

[54] COPPER-TIN TYPE SINTERED ALLOY FOR OIL-IMPREGNATED BEARING EXCELLENT IN BEARING PERFORMANCE AS BEARING USED IN LOW-LOAD AND HIGH-VELOCITY REGION

[75] Inventors: Kunio Obara; Tohru Kohno, both of Urawa; Hiroshi Sawaguchi, Ageo, all of Japan

[73] Assignee: Mitsubishi Kinzoku Kabushiki Kaisha, Tokyo, Japan

[21] Appl. No.: 77,579

[22] Filed: Sep. 21, 1979

[51] Int. Cl.³ .............................................. B22F 5/00
[52] U.S. Cl. ...................... 75/231; 75/154; 75/156; 75/156.5; 75/157; 308/DIG. 5; 308/DIG. 8; 428/566
[58] Field of Search .............. 75/231, 154, 156, 156.5, 75/157; 308/DIG. 5, DIG. 8; 428/566

[56] References Cited

U.S. PATENT DOCUMENTS

| | | | |
|---|---|---|---|
| 2,460,991 | 2/1949 | Le Brasse | 75/156 |
| 3,343,953 | 9/1967 | Schladitz | 75/231 |
| 3,370,944 | 2/1968 | Kawasaki | 75/156.5 |
| 3,375,107 | 3/1968 | Kranz | 75/156.5 |

Primary Examiner—Brooks H. Hunt
Attorney, Agent, or Firm—Frishauf, Holtz, Goodman & Woodward

[57] ABSTRACT

A copper-tin type sintered alloy for an oil-impregnated bearing excellent in bearing performance particularly as a bearing used in low-load and high-velocity region, having a chemical composition consisting essentially of, in weight percentage:

| | |
|---|---|
| Tin | from 8 to 11% |
| Phosphorus | from 0.2 to 1.7% | at least one solid lubricant, having an average particle size of from 20 to 80 μm, selected from the group consisting of:

| | |
|---|---|
| Molybdenum disulfide | from 1.1 to 11%, |
| and | |
| Tungsten disulfide | from 1.7 to 17%, |

Where,
the total amount of molybdenum disulfide and tungsten disulfide being up to 17%;
and,
the balance copper and incidental impurities;
said sintered alloy being prepared by sintering a green compact having said chemical composition at a temperature of from 650° to 750° C. for 10 to 30 minutes; and,
said sintered alloy including a copper-tin type sintered alloy for an oil-impregnated bearing, also containing at least one element selected from the group consisting of, in weight percentage:

| | |
|---|---|
| Graphite | from 0.2 to 0.8%, |
| Iron | from 0.1 to 1%, |
| Lead | from 0.5 to 5%, |
| and, | |
| Zinc | from 0.5 to 5%. |

3 Claims, 5 Drawing Figures

REFERENCE FIG. 1
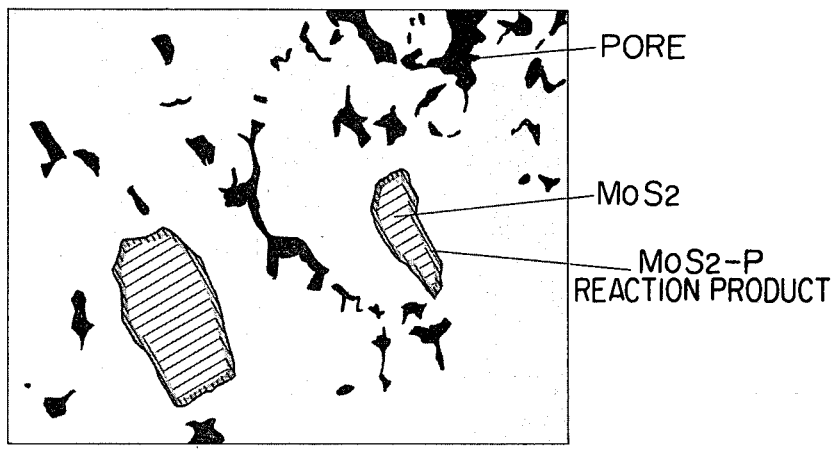
REFERENCE FIG. 2
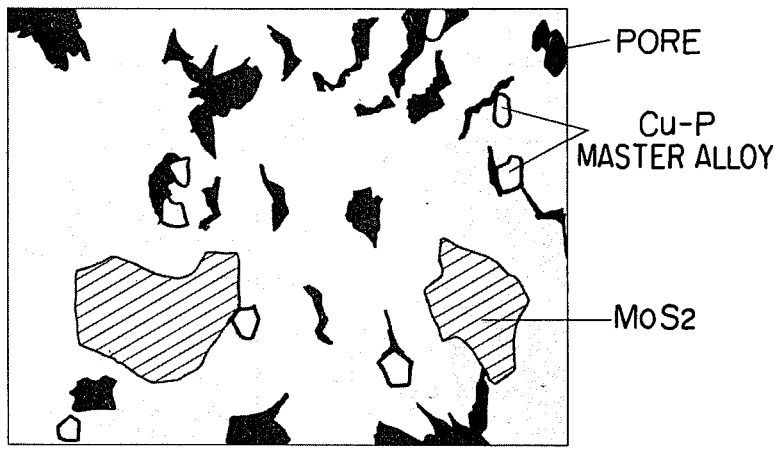
REFERENCE FIG. 3
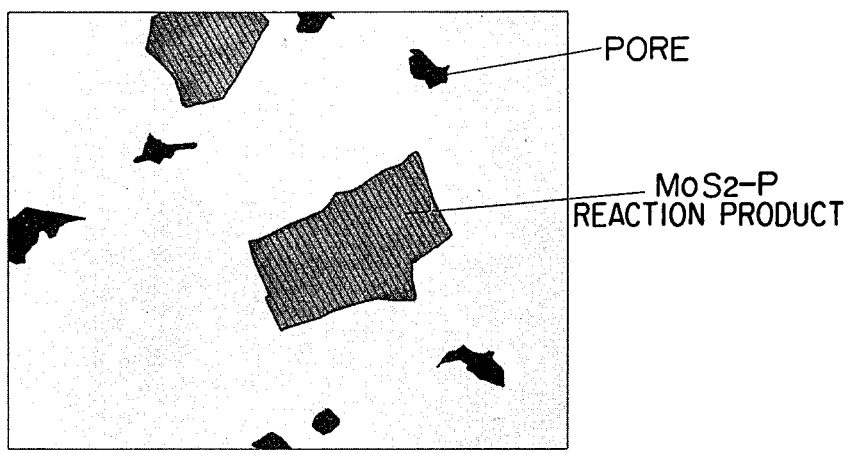

REFERENCE FIG. 4
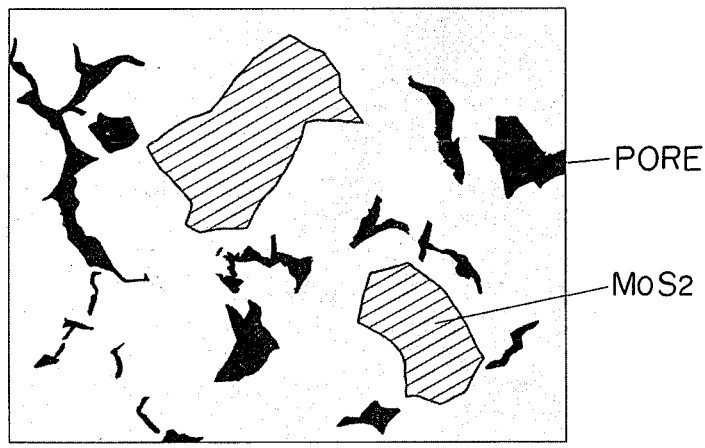
REFERENCE FIG. 5
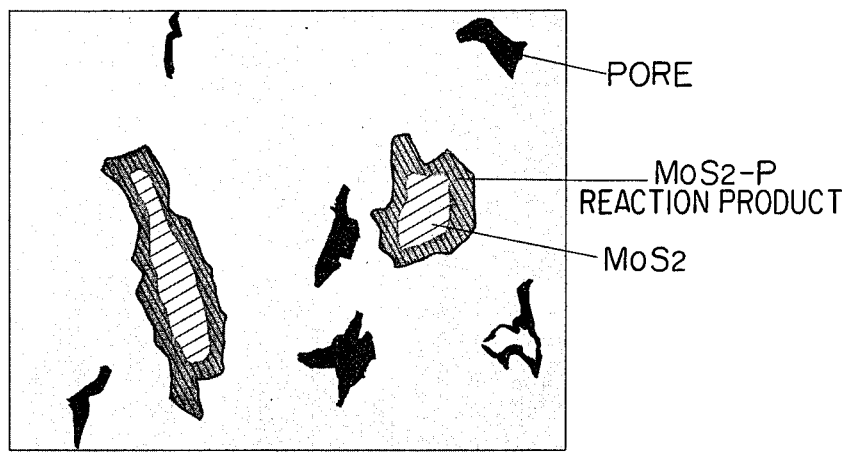

COPPER-TIN TYPE SINTERED ALLOY FOR OIL-IMPREGNATED BEARING EXCELLENT IN BEARING PERFORMANCE AS BEARING USED IN LOW-LOAD AND HIGH-VELOCITY REGION

REFERENCE TO PATENTS, APPLICATIONS AND PUBLICATIONS PERTINENT TO THE INVENTION

As far as we know, prior documents pertinent to the present invention are as follows:
(1) JIS (abbreviation of the Japanese Industrial Standards) B1581-1976, SBK 1218; and
(2) Japanese Patent Publication No. 451/60 dated Jan. 26, 1960.

The contents of the prior arts disclosed in the above-mentioned prior documents will be discussed under the "BACKGROUND OF THE INVENTION" described later.

Each one copy of the above-mentioned prior documents is attached hereto.

FIELD OF THE INVENTION

The present invention relates to a copper-tin type sintered alloy for an oil-impregnated bearing, which contains a solid lubricant and phosphorus having a high reactivity with said solid lubricant, has a high strength and a high oil content, and is excellent in bearing performance not only within the region of ordinary service conditions but also particularly as a bearing used in a lower-load and higher velocity region than the ordinary service conditions.

BACKGROUND OF THE INVENTION

An oil-impregnated bearing made of a sintered alloy (hereinafter simply referred to as a "sintered oil-impregnated bearing") is a bearing impregnated with a lubricant oil in very numerous open pores existing in the structure of a porous sintered alloy. When using such a sintered oil-impregnated bearing, it is not necessary to supply a lubricant oil from outside, but the lubricant oil impregnated therein permits display of functions as a bearing.

Machines and devices have at present a tendency toward ones lighter in weight and smaller in scale, in addition to the trend toward more complicated mechanisms. Along with this tendency, demand for sintered oil-impregnated bearings is only increasing year by year not only in the light industry producing home appliances and office machines, but also in the heavy industry manufacturing such products as machine tools, civil engineering machines and automobiles, for the purpose of simplifying the lubrication control and saving the required space in machines and devices.

Conventionally, copper-tin sintered alloy (hereinafter referred to as "Cu-Sn sintered alloy") has long been known as a copper-tin type sintered alloy for an oil-impregnated bearing.

In general, when a sintered oil-impregnated bearing is used under severe service conditions or for a long period of time, gradual oxidation and exhaustion of the lubricant oil impregnated therein reduce bearing performance, and finally cause seizure. It is therefore desirable that a sintered oil-impregnated bearing has a highest possible oil content. However, a too high oil content is not desirable because of the decrease in radial crushing strength of the sintered oil-impregnated bearing. For this reason, JIS (abbreviation of the Japanese Industrial Standards) B1581-1976, SBK1218 specifies the lowest allowable values of oil content and radial crushing strength of SBK alloy respectively as 18 vol. % and 15 kg/mm$^2$, considering the balance between oil content and radial crushing strength. Many of the Cu-Sn type sintered oil-impregnated bearings commercially available at present have an oil content of about 20 vol.% and a radial crushing strength of about 16 kg/mm$^2$, thus satisfying the oil content and the radial crushing strength specified for SBK alloy. However, when using these conventional Cu-Sn type sintered oil-impregnated bearings under severe service conditions, the insufficient oil content leads to a shorter service life.

Under such circumstances, with a view to reducing the friction at the metal-to-metal contact portion between a rotating shaft and a bearing in the state of boundary lubrication, i.e., in a state in which the rotating shaft and the bearing are partially in direct contact caused by the pressure drop of the lubricant oil film, for extending the service life of the aforementioned conventional Cu-Sn sintered oil-impregnated bearings by improving bearing performance thereof, a Cu-Sn type sintered alloy for an oil-impregnated bearing was proposed, which was added with fine powder of a solid lubricant such as graphite, lead, lead alloy and molybdenum sulfide to the conventional Cu-Sn sintered alloy.

For example, copper-tin-graphite sintered alloy (hereinafter referred to as "Cu-Sn-C sintered alloy") and copper-tin-lead-graphite sintered alloy (hereinafter referred to as "Cu-Sn-Pb-C sintered alloy") are known, and in particular, Cu-Sn-C sintered alloy is most common and widely employed throughout the world. For instance, JIS B1581-1976 sets out a Cu-Sn-C sintered alloy consisting of from 8 to 11 wt.% tin, up to 2 wt.% graphite, up to 1 wt.% iron, up to 0.5 wt.% miscellaneous elements and the balance copper as alloy No. SBK 1218 (hereinafter referred to as "SBK alloy").

The oil-impregnated bearing made of the conventional Cu-Sn type sintered alloy containing a solid lubricant shows an excellent bearing performance within the region of ordinary service conditions, i.e., within the region of service conditions under the state of boundary lubrication including a load, p, of up to 20 kg/cm$^2$, a peripheral velocity, V, of up to 200 m/minute, and a PV value (product of P and V) of up to 1,000 kg/cm$^2\cdot$m/minute, whereas in a lower-load and higher-velocity region as compared with ordinary service conditions, i.e., under service conditions including a load, P, of up to about 5 kg/cm$^2$ and a peripheral velocity of at least about 400 m/minute, the oil-impregnated bearing made of the conventional Cu-Sn type sintered alloy was almost unserviceable as a bearing. More particularly, the above-mentioned sintered oil-impregnated bearing seriously wears in the state of boundary lubrication before transfer to the high-velocity region, i.e., the very severe state of service conditions in which the rotating shaft and the bearing partially come into direct contact without having an intermediary lubrication oil film in between, and is defective because of the bearing performance rather reduced by causes as described later in the state of hydrodynamic lubrication after complete transfer to the high-velocity region, i.e., in the state in which the impregnated lubrication oil forms an oil film having a hydrodynamically sufficient thickness and there is no partial metal-to-metal contact portion between the rotating shaft and the bearing.

When a large quantity of solid lubricant is added to the conventional Cu-Sn type sintered alloy in an attempt to alleviate this severe state of boundary lubrication, the alloy matrix is broken into pieces, resulting in a lower strength of the alloy matrix and also a decreased wear resistance of the bearing. On the other hand, if the forming pressure is increased when forming the green compact with a view to compensating the decrease in the strength of the alloy matrix, the oil content which is indispensable for a sintered oil-impregnated bearing decreases. If, furthermore, the sintering temperature is raised for compensating the decrease in the strength of the alloy matrix, a solid lubricant such as molybdenum disulfide, if used, is decomposed and scatters. Moreover, if lead and/or lead alloy is employed as a lubricating constituent, a higher temperature activates the liquidus sintering phenomenon, thus not only increasing the density of the sintered alloy, but also causing pore closing phenomenon in open pores for impregnating the lubrication oil, hence resulting in a decreased oil content.

In order to improve the strength of Cu-Sn-C alloy, the known practice is to add phosphorus. For example, Japanese Patent Publication No. 451/60 dated Jan. 26, 1960 discloses a sliding plate for collector for an electric car, made of a sintered alloy consisting of from 0.1 to 5 wt.% phosphorus, from 5 to 18 wt.% tin, from 2 to 10 wt.% graphite, and the balance copper. However, the sintered alloy disclosed in said Japanese Patent Publication was developed for a collector sliding plate for an electric car, not for an oil-impregnated bearing. The addition of phosphorus is therefore only to improve the strength and the hardness of a sliding plate. The sintered alloy consisting of 1 wt.% phosphorus, 15 wt.% tin, 5 wt.% graphite and 79 wt. % copper, which is described as the only example in said Japanese Patent Publication, has an oil content of only 1 vol.%. The sintered alloy disclosed in said Japanese Patent Publication is not therefore suitable at all as an alloy for an oil-impregnated bearing.

SUMMARY OF THE INVENTION

An object of the present invention is therefore to provide a copper-tin type sintered alloy for an oil-impregnated bearing, having a high oil content and a high radial crushing strength.

A principal object of the present invention is to provide a copper-tin type sintered alloy for an oil-impregnated bearing, which is excellent in bearing performance not only under ordinary service conditions, but also as a bearing used in a lower-load and higher-velocity region than ordinary service conditions, i.e., under service conditions including a load of up to 5 kg/cm$^2$ and a peripheral velocity of from 400 to 1,400 m/minute.

In accordance with one of the features of the present invention, there is provided a copper-tin type sintered alloy for an oil-impregnated bearing excellent in bearing performance particularly as a bearing used in low-load and high-velocity region, having a chemical composition consisting essentially of, in weight percentage:

| Tin | from 8 to 11%; |
| Phosphorus | from 0.2 to 1.7%; | at least one solid lubricant, having an average particle size of from 20 to 80 μm, selected from the group consisting of:

| Molybdenum disulfide and | from 1.1 to 11%, |
| Tungsten disulfide | from 1.7 to 17%, | where,
the total amount of molybdenum disulfide and tungsten disulfide being up to 17%;
and,
the balance copper and incidental impurities;
said sintered alloy being prepared by sintering a green compact having said chemical composition at a temperature of from 650° to 750° C. for 10 to 30 minutes; and,
said sitered alloy including a copper-tin type sintered alloy for an oil impregnated bearing, also containing at least one element selected from the group consisting of, in weight percentage:

| Graphite | from 0.2 to 0.8%, |
| Iron | from 0.1 to 1%, |
| Lead | from 0.5 to 5%, |
| and, | |
| Zinc | from 0.5 to 5%. |

BRIEF DESCRIPTION OF THE REFERENCE DRAWINGS

Reference FIG. 1 is a sketch illustrating an example of the structure of the Cu-Sn type sintered alloy of the present invention;

Reference FIG. 2 is a sketch illustrating the structure of a Cu-Sn type sintered alloy outside the scope of the present invention, which has a phosphorus content within the range of phosphorus contents of the present invention but a sintering temperature lower than the range of sintering temperatures of the present invention;

Reference FIG. 3 is a sketch illustrating the structure of a Cu-Sn type sintered alloy outside the scope of the present invention, which has a phosphorus content within the range of phosphorus contents of the present invention but a sintering temperature higher than the range of sintering temperatures of the present invention;

Reference FIG. 4 is a sketch illustrating the structure of a Cu-Sn type sintered alloy outside the scope of the present invention, which has a sintering temperature within the range of sintering temperatures of the present invention but a phosphorus content lower than the range of phosphorus contents of the present invention; and, Reference FIG. 5 is a sketch illustrating the structure of a Cu-Sn type sintered alloy outside the scope of the present invention, which has a sintering temperature within the range of sintering temperatures of the present invention but a phosphorus content higher than the range of phosphorus contents of the present invention.

DETAILED DESCRIPTION OF PREFERRED EMBODIMENTS

With a view to obtaining an oil-impregnated bearing made of a Cu-Sn type sintered alloy showing an excellent bearing performance not only under ordinary service conditions, but also as a bearing used in a lower-load and higher-velocity region than the ordinary service conditions, i.e., under conditions including a load of up to 5 kg/cm$^2$ and a peripheral velocity of from 400 to 1,400 m/minute, and added with a solid lubricant, by solving the aforementioned problems encountered in the conventional Cu-Sn type sintered alloys, especially in the conventional Cu-Sn type sintered alloys containing a solid lubricant, we carried out extensive studies. As a result, we obtained the following findings:

(1) When an appropriate quantity of phosphorus (P) is further added to a conventional Cu-Sn type sintered alloy containing a solid lubricant, diffusion of Sn into the Cu matrix is promoted during sintering, thus forming a tough Cu-Sn-P sintered alloy at a sintering temperature lower than the conventional sintering temperatures. On the other hand, since the Cu matrix itself is also expanded, it is possible to obtain a sintered alloy having a high oil content and a high strength.

(2) As mentioned above, in an oil-impregnated bearing made of a conventional Cu-Sn type sintered alloy containing a solid lubricant, the impregnated lubricant oil forms an oil film having a hydrodynamically sufficient thickness between the rotating shaft and the bearing in the state of hydrodynamic lubrication after transfer to the high-velocity region, and bearing performance rather decreases sometimes under the ideal state in which there is no partial metal-to-metal contact between the rotating shaft and the bearing. The cause is that fine powder of the solid lubricant in the sintered alloy comes off and is mixed into the lubricant oil film, thus increasing the apparent viscosity of the lubricant oil and resulting, in the high-velocity region, not only in an increased coefficient of friction between the rotating shaft and the bearing, but also in an increased temperature of the bearing. As a result, the lubricant oil is exhausted and deteriorated, leading to a seriously degraded bearing performance of the oil-impregnated bearing.

(3) One of the possible solutions for preventing the solid lubricant from mixing into the lubricant oil film in the high-velocity region is to use solid lubricant particles larger in diameter to some extent. By using solid libricant particles larger in size to some extent, the solid lubricant is present in the sintered alloy matrix even in the state of boundary lubrication before transfer to the high-velocity region, i.e., in the state in which the rotating shaft and the bearing are partially in direct contact without having an intermediary lubricant oil film in between. This reduces the metal-to-metal contact portion between the rotating shaft and the bearing and the contact portion between the rotating shaft and the solid lubricant is added in furtherance, this largely reducing the frictional coefficient.

(4) However, in order to satisfactorily prevent the solid lubricant from mixing into the lubricant oil, it does not suffice to use solid lubricant particles larger in size to some extent, but it is necessary to limit the solid lubricant to molybdenum disulfide ($MoS_2$) and/or tungsten disulfide ($WS_2$), add P, and strictly limit the P content and the sintering conditions within certain limits.

(5) When $MoS_2$ and/or $WS_2$ is used as the solid lubricant and P is added, P which is highly reactive with $MoS_2$ and $WS_2$ reacts with $MoS_2$ and $WS_2$ toward the end of the sintering process, forming reaction products, $(Mo, P)_x S_y$ and/or $(W, P)_x S_y$, inwardly from the surfaces of these solid lubricant particles. Expansion of the volume of the solid lubricant particles in the course of this reaction causes the solid lubricant to closely adhere to the sintered alloy matrix, and the above-mentioned reaction products act as a kind of binder, thus preventing the solid lubricant from coming off the sintered alloy matrix and mixing into the lubricant oil film.

(6) However, said reaction products have not originally lubricating property. It is therefore desirable to cause production of said reaction products only on the interface between the solid lubricant particles and the sintered alloy matrix as far as possible, and for this purpose, it is necessary to strictly limit the P content and the sintering conditions within certain limits.

The present invention was achieved on the basis of the above-mentioned findings (1) to (6), and the copper-tin type sintered alloy for an oil-impregnated bearing excellent in bearing performance, particularly as a bearing used in the low-load and high-velocity region of the present invention is characterized by:

having a chemical composition consisting essentially of, in weight percentage:

| | |
|---|---|
| Tin | from 8 to 11%; |
| Phosphorus | from 0.2 to 1.7%; | at least one solid lubricant, having an average particle size of from 20 to 80 μm, selected from the group consisting of:

| | |
|---|---|
| Molybdenum disulfide and | from 1.1 to 11%, |
| Tungsten disulfide | from 1.7 to 17%, | where,
the total amount of molybdenum disulfide and tungsten disulfide being up to 17%;
and,
the balance copper and incidental impurities;
said sintered alloy being prepared by sintering a green compact having said chemical composition at a temperature of from 650° to 750° C. for 10 to 30 minutes; and,
said sintered alloy including a copper-tin type sintered alloy for oil-impregnated bearing also containing at least one element selected from the group consisting of, in weight percentage:

| | |
|---|---|
| Graphite | from 0.2 to 0.8%, |
| Iron | from 0.1 to 1%, |
| Lead and, | from 0.5 to 5%, |
| Zinc | from 0.5 to 5%. |

Now, the reasons why the range of contents of the constituents and the sintering conditions are limited as mentioned above in the present invention are described below.

(A) Tin

Tin (Sn) has the effect of improving strength and hardness of the Cu-Sn type sintered alloy. However, with an Sn content of under 8 wt. %, a desired effect cannot be obtained in the improvement of alloy strength and hardness. The Sn content should therefore be at least 8 wt. %. On the other hand, with an Sn content of over 11 wt. %, hardness of the alloy is improved whereas strength of the alloy is reduced. The Sn content should therefore be up to 11 wt. %.

(B) Phosphorus

Phosphorus (P) is a characteristic element to be added in the Cu-Sn type sintered alloy of the present invention. P has the effect of improving strength and porosity, i.e., the oil content, of the Cu-Sn type sintered alloy. In addition, by reacting with $MoS_2$ and $WS_2$ as solid lubricants, P forms a layer of reaction products, $(Mo, P)_xS_y$ and/or $(W, P)_xS_y$, on the interface between the sintered alloy matrix and said solid lubricant, thus exerting the effect of improving adhesion between said solid lubricant and the sintered alloy matrix.

However, with a P content of under 0.2 wt. %, not only a desired effect cannot be obtained in the improvement of strength and oil content of the sintered alloy, but also there is not available the effect of forming desired reaction products through reaction with $MoS_2$ and $WS_2$ as the solid lubricants. The P content should therefore be at least 0.2 wt. %. On the other hand, with a P content of over 1.7 wt. %, the amount of liquid phase becomes excessive at the time of sintering, causing a phenomenon known as liquidus sintering, thus resulting in the increase in the density and the occurrence of pore closure, and hence in the decrease in the porosity, i.e., oil content. Furthermore, the excess reaction between said solid lubricant and P leads to a too thick layer of reaction products, thus reducing lubricating performance of the solid lubricant. The P content should therefore be up to 1.7 wt. %.

(C) Molybdenum disulfide and tungsten disulfide

Molybdenum disulfide ($MoS_2$) and tungsten disulfide ($WS_2$) as solid lubricants have the effect of improving bearing performance of a bearing made of a Cu-Sn type sintered alloy. Particularly, an oil-impregnated bearing made by adding at least one of $MoS_2$ and $WS_2$ to a Cu-Sn type sintered alloy, limiting the average particle size of $MoS_2$ and $WS_2$ within the range of from 20 to 80 μm, more preferably, from 40 to 60 μm, also limiting the $MoS_2$ and $WS_2$ contents respectively within the range of from 1.1 to 11 wt. % and from 1.7 to 17 wt. %, and further limiting the total amount of $MoS_2$ and $WS_2$ to up to 17 wt. %, shows a very stable and excellent bearing performance not only under ordinary service conditions, but also as a bearing used in the low-load and high-velocity region with a load of up to 5 kg/cm² and a peripheral velocity of from 400 to 1,400 m/minute.

The reasons why the average particle size and the contents of $MoS_2$ and $WS_2$ are limited as mentioned above are as follows. With an average particle size of $MoS_2$ and $WS_2$ of under 40 μm, particularly of under 20 μm, $MoS_2$ and $WS_2$ in the sintered alloy come off and mix into the lubricant oil film, thus making it impossible to ensure a desired bearing performance in the high-velocity region. On the other hand, with an average particle size of $MoS_2$ and $WS_2$ of over 60 μm, particularly of over 80 μm, the average distance between particles of $MoS_2$ and $WS_2$ in the sintered alloy matrix becomes too large because of the limited content of the solid lubricants. This reduces the effect of alleviating friction at the metal-to-metal contact portion between the rotating shaft and the bearing, leading to a lower bearing performance. The average particle size of $MoS_2$ and $WS_2$ should therefore be within the range of from 20 to 80 μm, more preferably, from 40 to 60 μm. With an $MoS_2$ content of under 1.1 wt. % and a $WS_2$ content of under 1.7 wt. %, it is not possible to achieve a desired alleviation of friction by reducing metal-to-metal contact between the rotating shaft and the bearing. On the other hand, with an $MoS_2$ content of over 11 wt. %, a $WS_2$ content of over 17 wt. % and a total $MoS_2$ and $WS_2$ content of over 17 wt. %, strength of the sintered alloy matrix is reduced, and it becomes difficult to cause $MoS_2$ and $WS_2$ to satisfactorily adhere to the sintered alloy matrix. As a result, $MoS_2$ and $WS_2$ come off the sintered alloy matrix, mix into the lubricant oil film, and thus, seriously impair bearing performance in the high-velocity region. The contents of $MoS_2$ and $WS_2$ should therefore be respectively within the range of from 1.1 to 11 wt. % and from 1.7 to 17 wt. %, and the total $MoS_2$ and $WS_2$ content should be up to 17 wt. %.

(D) Graphite, iron, lead and zinc

In the present invention, as described later, at least one of graphite, iron, lead and zinc may be added as required with a view to further improving strength or bearing performance as an oil-impregnated bearing, of the Cu-Sn type sintered alloy.

(1) Graphite:

Graphite (C) has the effect of improving bearing performance of an oil-impregnated bearing in the state of boundary lubrication, i.e., in a state in which the rotating shaft and the bearing partially come into direct contact, as an assistant to $MoS_2$ and/or $WS_2$ as a solid lubricant. However, with a C content of under 0.2 wt. %, a desired effect cannot be obtained in the above-mentioned improvement. The C content should therefore be at least 0.2 wt. %. On the other hand, with a C content of over 0.8 wt. %, in the state of hydrodynamic lubrication after transfer to the high-velocity region, i.e., in a state in which a lubricant oil film having a hydrodynamically sufficient thickness is formed between the rotating shaft and the bearing, C is present in suspension in the lubricant oil film and increases the apparent viscosity of the lubricant oil film. This results not only in an increased frictional coefficient between the rotating shaft and the bearing but also in an increased temperature of the bearing in the high-velocity region. Consequently, the lubricant oil is exhausted and deteriorated, thus seriously impairing bearing performance of the oil-impregnated bearing. The C content should therefore be up to 0.8 wt. %.

(2) Iron:

Iron (Fe) has the effect of improving strength of the sintered alloy matrix. However, with an Fe content of under 0.1 wt. %, a desired effect cannot be obtained in the improvement of strength of the sintered alloy matrix. The Fe content should therefore be at least 0.1 wt. %. On the other hand, with an Fe content of over 1 wt. %, hard Fe particles remain in the sintered alloy structure as they are, and thus prevents the bearing from getting to fit. The Fe content should therefore be up to 1 wt. %.

(3) Lead:

Lead (Pb) has the effect of improving get-to-fit property and seizure resistance of an oil-impregnated bearing. More specifically, Pb forms a thin Pb film through fluidization caused by the friction heat, this Pb film then being oxidized into a PbO film. The presence of the resultant PbO film between the rotating shaft and the bearing improves get-to-fit property of the oil-impregnated bearing, and prevents seizure. However, with a Pb content of under 0.5 wt. %, a desired effect cannot be obtained in the above-mentioned improvement. The Pb content should therefore be at least 0.5 wt. %. On the other hand, a Pb content of over 5 wt. % reduces strength of the sintered alloy matrix. The Pb content should therefore be up to 5 wt. %.

(4) Zinc:

Zinc (Zn) has the effect of improving strength of the sintered alloy matrix. However, with a Zn content of under 0.5 wt. %, a desired effect cannot be obtained in the improvement of strength of the sintered alloy matrix. The Zn content should therefore be at least 0.5 wt. %. On the other hand, with a Zn content of over 5 wt. %, the sintered alloy matrix becomes too hard, thus impairing get-to-fit property of the oil-impregnated bearing. The Zn content should therefore be up to 5 wt. %.

In addition to the chemical composition of the Cu-Sn type sintered alloy for an oil-impregnated bearing of the present invention described in detail above, incidental impurities such as arsenic (As), antimony (Sb), bismuth (Bi) and Sulfur (S) may sometimes be contained.

(E) Sintering conditions

Oil-impregnated bearing made of the Cu-Sn type sintered alloy of the present invention is manufactured by pressing a raw material powder mixture having the aforementioned chemical composition under a pressure of from 1 to 3 tons/cm$^2$ to form a green compact, and sintering the green compact thus obtained in a reducing atmosphere at a temperature of from 650° to 750° C. for 10 to 30 minutes.

As mentioned above, one of the most important features of the Cu-Sn type sintered alloy for an oil-impregnated bearing of the present invention is to add P. P has the effect, through reaction with $MoS_2$ or $WS_2$ as a solid lubricant in the course of sintering, of forming reaction products, $(Mo, P)_xS_y$ or $(W, P)_xS_y$, on the interface between the solid lubricant and the sintered alloy matrix. Furthermore, P has another effect of allowing sintering of the green compact at a relatively low temperature as compared with the ordinary sintering temperature of from 700° C. to 800° C.

More particularly, the phenomena occurring in the process of sintering when manufacturing the Cu-Sn type sintered alloy of the present invention are considered to be as follows. First, Sn powder is melted through the heating process to the sintering temperature, reacts with Cu powder surrounding the Sn powder, forms a Cu-Sn compound having a higher Sn concentration, and is solidified. Then, along with heating to a higher temperature, said Cu-Sn compound is melted again, forms a Cu-Sn compound having a relatively low Sn concentration, and is solidified. Through the repetition of this melting-solidification-remelting process, Sn diffuses into the Cu matrix to form a uniform and high-strength Cu-Sn solid solution. Also, P added in the form of a fine master alloy (a Cu-P alloy in general) is wetted onto the Cu powder surface at the time of melting of Sn and Cu-Sn compound and diffuses into the Cu matrix at a relatively low sintering temperature. Thus, a Cu-Sn-P sintered alloy is obtained, which has a high oil content and a high strength. Toward the end of sintering process, P having a high reactivity with $MoS_2$ and $WS_2$ as solid lubricants begins to react with $MoS_2$ and $WS_2$ and forms reaction products from the particles surfaces of these solid lubricants toward inside. In this process of reaction, the volume of the solid lubricant particles expands, so that solid lubricant particles have a satisfactory adhesion with the sintered alloy matrix. Said reaction products are estimated to be compounds expressed in the form of $(Mo, P)_xS_y$ or $(W, P)_xS_y$. As mentioned above, said reaction products have the effect, as a kind of binder, of causing the solid lubricant to firmly adhere to the sintered alloy matrix. As a result, the Cu-Sn type sintered alloy of the present invention, when used for an oil-impregnated bearing, can prevent, even in the low-load and high-velocity region, the solid lubricant from coming off sintered alloy matrix, mixing into the lubricant oil film, and thus impairing bearing performance. However, because said reaction products has not lubricating property as they are, it is necessary to cause said reaction products to form only on the interface between the solid lubricant particles and the sintered alloy matrix as far as possible, and in the form of a thin layer on the surface of the solid lubricant particles. It is needless to mention that the major portion of P dissolves into the alloy matrix to form a solid-solution, or remains in the alloy matrix in the form of $Cu_3P$, thus improving strength of the alloy.

One of the important features of the present invention is therefore to form a thin layer of said reaction products on the surface of $MoS_2$ or $WS_2$ particles, which contribute to the improvement of bearing performance not only under ordinary service conditions but also particularly as a bearing used in the low-load and high-velocity region, by adding P having a high reactivity with $MoS_2$ and $WS_2$ as solid lubricants in a specified amount to a Cu-Sn type sintered alloy, and sintering a green compact under strictly controlled sintering conditions. The relation between the P content and the sintering conditions is therefore described by means of an example of test.

EXAMPLE OF TEST

A Cu powder having a particle size of up to 147 μm, an Sn powder having a particle size of up to 44 μm, a Cu-P alloy (a Cu-8.4% P eutectic alloy) powder having a particle size of up to 44 μm, and an $MoS_2$ powder having an average particle size of from 40 to 60 μm were blended and mixed so as to give the final chemical composition as shown in Table 1. The resultant powder mixture was pressed to form green compacts. The green compacts thus obtained were sintered in an inert atmosphere respectively under the sintering conditions as shown in Table 1 to prepare sintered alloys for test (hereinafter to as "test alloys") Nos. 1 to 5.

TABLE 1

| Test alloy No. | Chemical composition (wt. %) | | | | Sintering conditions | |
|---|---|---|---|---|---|---|
| | Sn | $MoS_2$ | P | Cu and incidental impurities | Temp. (°C.) | Time (minute) |
| 1 | 10 | 6.6 | 0.8 | balance | 720 | 30 |
| 2 | 10 | 6.6 | 0.8 | balance | 600 | 30 |
| 3 | 10 | 6.6 | 0.8 | balance | 800 | 30 |
| 4 | 10 | 6.6 | 0.1 | balance | 720 | 30 |
| 5 | 10 | 6.6 | 2.0 | balance | 720 | 30 |

Then, metallographical structures of the test alloys Nos. 1 to 5 were observed by means of an E.P.M.A. (abbreviation of "Electron Probe Micro Analyzer") for a case where the P content was kept within the scope of the present invention and the sintering conditions were varied to outside the scope of the present invention, and for another case where the sintering conditions were kept within the scope of the present invention and the P content was varied to outside the scope of the present invention. The results of said observation are represented in the sketches of Reference FIGS. 1 to 5.

As shown in Reference FIG. 1, in the test alloy No. 1 of which both the P content and the sintering conditions are within the scope of the present invention, Sn and P uniformly diffuse into the Cu matrix, and a very thin layer of reaction products of P and $MoS_2$ is formed on the surfaces of $MoS_2$ particles.

As shown in Reference FIG. 2, in the test alloy No. 2 of which the P content is within the scope of the present invention but the sintering temperature is lower than the scope of the present invention, the added Cu-P alloy remains in the Cu matrix as it is, and almost no reaction products of P and $MoS_2$ are formed on the surfaces of $MoS_2$ particles.

As shown in Reference FIG. 3, in the test alloy No. 3 of which the P content is within the scope of the present invention but the sintering temperature is higher than the scope of the present invention, most of $MoS_2$ having lubricating property are converted into reaction products of P and $MoS_2$ without lubricating property because of the excess reaction between P and $MoS_2$.

As shown in Reference FIG. 4, in the test alloy No. 4 of which the sintering conditions are within the scope of the present invention but the P content is lower than the scope of the present invention, almost no reaction products of P and $MoS_2$ are formed on the surfaces of $MoS_2$ particles, as in the test alloy No. 2.

As shown in Reference FIG. 5, in the test alloy No. 5 of which the sintering conditions are within the scope of the present invention but the P content is higher than the scope of the present invention, the too much amount of Cu-Sn-P liquid phase at the time of sintering causes a phenomenon known as liquidus sintering, resulting in an increased density and in a serious decrease of open pores indispensable for an oil-impregnated bearing. In the test alloy No. 5, furthermore, the layer of reaction products of P and $MoS_2$ formed on the surfaces of $MoS_2$ particles is too thick.

As is evident from the results of observation described above, in the case where the P content is within the scope of the present invention, i.e., within the range of from 0.2 to 1.7 wt. %, but the sintering conditions are outside the scope of the present invention, that is, the sintering temperature is outside the range of from 650° to 750° C. and the sintering time is outside the range of from 10 to 30 minutes, and in the case where the sintering conditions are within the scope of the present invention, but the P content is outside the scope of the present invention, a thin film of reaction products of P and solid lubricants is not formed on the particle surfaces of the solid lubricants, and thus, it is impossible to obtain a Cu-Sn type sintered alloy for an oil-impregnated bearing excellent in bearing performance in the low-load and high-velocity region.

In the present invention, therefore, it is very important to strictly limit the P content and the sintering conditions within the ranges mentioned above.

Now, the Cu-Sn type sintered alloy for an oil-impregnated bearing of the present invention is described more in detail while comparing with reference sintered alloys.

EXAMPLE 1

A Cu powder having a particle size of up to 147 μm, an Sn powder having a particle size of up to 44 μm, a Cu-P alloy (P-8.4% eutectic alloy) powder having a particle size of up to 44 μm, and an $MoS_2$ powder and/or $WS_2$ powder having an average particle size of from 40 to 60 μm were blended and mixed so as to give the final chemical composition as shown in Table 2. The resultant powder mixture was pressed under a pressure of from 1 to 3 tons/cm² to form green compacts. The green compacts thus obtained were sintered in a hydrogen atmosphere respectively under the sintering conditions as shown in Table 2 to prepare sintered alloys within the scope of the present invention (hereinafter referred to as "alloys of the present invention") Nos. 1 to 9 and sintered alloys outside the scope of the present invention (hereinafter referred to as "reference alloys") Nos. 10 to 16.

TABLE 2

| Alloy No. | | Chemical composition (wt. %) | | | | Sintering conditions | |
|---|---|---|---|---|---|---|---|
| | | Sn | $MoS_2$ | $WS_2$ | P | Cu and incidental impurities | Temp. (°C.) | Time (minute) |
| Alloy of the present invention | 1 | 10 | 6.6 | — | 0.2 | balance | 720 | 30 |
| | 2 | 10 | 6.6 | — | 0.5 | balance | 720 | 30 |
| | 3 | 10 | 6.6 | — | 0.8 | balance | 720 | 30 |
| | 4 | 10 | 6.6 | — | 1.0 | balance | 720 | 30 |
| | 5 | 10 | 6.6 | — | 1.7 | balance | 720 | 30 |
| | 6 | 10 | — | 10.2 | 0.5 | balance | 720 | 30 |
| | 7 | 10 | — | 10.2 | 0.8 | balance | 720 | 30 |
| | 8 | 10 | 3.3 | 5.1 | 0.5 | balance | 720 | 30 |
| | 9 | 10 | 3.3 | 5.1 | 0.8 | balance | 720 | 30 |
| Reference Alloy | 10 | 10 | 6.6 | — | 0.1 | balance | 720 | 30 |
| | 11 | 10 | 6.6 | — | 2.0 | balance | 720 | 30 |
| | 12 | 10 | 6.6 | — | 0.5 | balance | 600 | 30 |
| | 13 | 10 | 6.6 | — | 0.8 | balance | 600 | 30 |
| | 14 | 10 | 6.6 | — | 0.5 | balance | 800 | 30 |
| | 15 | 10 | 6.6 | — | 0.8 | balance | 800 | 30 |
| | 16 | 10 | 6.6 | — | — | balance | 700 | 30 |

Then, density, oil content and radial crushing strength were measured for each of the alloys of the present invention Nos. 1 to 9 and the reference alloys Nos. 10 to 16 shown in Table 2. The results of said measurement are given in Table 3.

TABLE 3

| | Alloy No. | Physical properties | | |
|---|---|---|---|---|
| | | Density (g/cm³) | Oil content (vol. %) | Radial crushing strength (kg/mm²) |
| Alloy of the present invention | 1 | 6.43 | 25.7 | 24.5 |
| | 2 | 6.43 | 24.9 | 25.2 |
| | 3 | 6.41 | 25.0 | 26.7 |
| | 4 | 6.40 | 25.5 | 27.5 |
| | 5 | 6.40 | 26.0 | 28.0 |
| | 6 | 6.42 | 24.2 | 26.9 |
| | 7 | 6.40 | 24.7 | 27.1 |
| | 8 | 6.41 | 25.0 | 26.0 |
| | 9 | 6.43 | 24.9 | 27.3 |
| Reference alloy | 10 | 6.49 | 22.0 | 22.7 |
| | 11 | 6.70 | 11.2 | 28.3 |
| | 12 | 6.52 | 20.1 | 16.0 |
| | 13 | 6.48 | 20.9 | 15.7 |
| | 14 | 6.69 | 13.5 | 27.5 |
| | 15 | 6.62 | 10.9 | 28.7 |
| | 16 | 6.53 | 21.2 | 22.0 |

As is clear from the results of measurement shown in Table 3, in the alloys of the present invention Nos. 1 to 9, both oil content and radial crushing strength are high, and the physical properties of the sintered alloys are improved by a proper combination of the P content and the sintering conditions. In the reference alloys Nos. 10 to 16, in contrast, no improvement is observed in oil content and radial crushing strength. More particularly, in the reference alloy No. 10 (same as the test alloy No. 4 in Table 1) of which the sintering conditions are within the scope of the present invention but the P content is lower than the scope of the present invention, no improvement is observed in oil content and radial crushing strength. In the reference alloy No. 11 (same as the test alloy No. 5 in Table 1) of which the sintering conditions are within the scope of the present invention but the P content is higher than the scope of the present invention, a phenomenon known as liquidus sintering causes an increase in density and a serious decrease in oil content. In the reference alloys Nos. 12 and 13 (same as the test alloy No. 2 in Table 1) of which the P content is within the scope of the present invention, the sintering temperature lower than the scope of the present invention leads to a low radial crushing strength. In the reference alloys Nos. 14 and 15 (same as the test alloy No. 3 in Table 1) of which the P content is within the scope of the present invention, the sintering temperature higher than the scope of the present invention leads to a higher density and a lower oil content. The reference alloy No. 16 is a conventional Cu-Sn type sintered alloy for an oil-impregnated bearing, which contains $MoS_2$ as the solid lubricant, but not P.

Then, for the purpose of evaluating bearing performance for each of oil-impregnated bearings respectively prepared from the alloys of the present invention Nos. 1 to 9 and the reference alloys Nos. 10 to 16 shown in Table 2, oil-impregnated bearings Nos. 1 to 9 were prepared from the alloys of the present invention Nos. 1 to 9 (hereinafter referred to as "bearings of the present invention"), and oil-impregnated bearings Nos. 10 to 16, from the reference alloys Nos. 10 to 16 (hereinafter referred to as "reference alloy bearings"). These oil-impregnated bearings were prepared by impregnating respective sintered alloys, formed into a bearing shape with dimensions of an inside diameter of 8 mm, an outside diameter of 16 mm and a length of 8 mm, with a low-viscosity synthetic oil by the ordinary vacuum impregnating process.

Then a running test was carried out for the bearings of the present invention Nos. 1 to 9 and the reference alloy bearings Nos. 10 to 16, with the use of S 45 C tempered material (hardness $H_RC$: 30 to 35) as the rotating shaft, in a lower-load and higher-velocity region than ordinary service conditions, i.e., under service conditions including a load, P, of 3 kg/cm² and a peripheral velocity, V, of 800 m/minute, that is, a PV value of 2,400 kg/cm².m/minute (hereinafter referred to as the "condition I"), and also under ordinary service conditions including a load, P, of 10 kg/cm² and a peripheral velocity, V, of 75 m/minute, that is, a PV value of 750 kg/cm². m/minute (hereinafter referred to as the "condition II"), at a room temperature of about 25° C. for about 4 hours, to measure the frictional coefficient, the bearing temperature, and the amount of wear of the bearings. The results of said measurement are indicated in Table 4.

TABLE 4

| Bearing No. | | Condition I | | | Condition II | | |
|---|---|---|---|---|---|---|---|
| | | Frictional coefficient (μ) | Bearing temp. (°C.) | Amount of wear (μm) | Frictional coefficient (μ) | Bearing temp. (°C.) | Amount of wear (μm) |
| Bearing of the present invention | 1 | 0.05 | 43 | 3 | 0.10 | 38 | 2 |
| | 2 | 0.04 | 41 | 3 | 0.10 | 38 | 2 |
| | 3 | 0.05 | 45 | 2 | 0.10 | 40 | 2 |
| | 4 | 0.04 | 40 | 2 | 0.10 | 40 | 1 |
| | 5 | 0.04 | 40 | 1 | 0.10 | 42 | 1 |
| | 6 | 0.05 | 40 | 3 | 0.10 | 42 | 2 |
| | 7 | 0.04 | 42 | 2 | 0.10 | 40 | 2 |
| | 8 | 0.05 | 43 | 3 | 0.09 | 40 | 2 |
| | 8 | 0.05 | 43 | 2 | 0.10 | 42 | 1 |
| Reference alloy bearing | 10 | 0.08 | 57 | 10 | 0.11 | 45 | 5 |
| | 11 | 0.10 | 60 | 4 | 0.15 | 62 | 3 |
| | 12 | 0.10 | 60 | 15 | 0.13 | 54 | 8 |
| | 13 | 0.10 | 60 | 15 | 0.13 | 54 | 8 |
| | 14 | 0.09 | 58 | 4 | 0.15 | 60 | 3 |
| | 15 | 0.10 | 60 | 4 | 0.15 | 62 | 3 |
| | 16 | 0.08 | 56 | 11 | 0.10 | 42 | 5 |

As shown in Table 4, all of the bearings of the present invention Nos. 1 to 9 not only show a bearing performance well comparable with the reference alloy bearings Nos. 10 to 16 under ordinary service conditions, i.e., under the condition II, but also exhibit a very excellent bearing performance with a low frictional coefficient, a low bearing temperature and the very small amount of wear also in a lower-load and higher-velocity region than ordinary service conditions, i.e., under the condition II. On the contrary, the reference alloy bearings Nos. 10 to 15, of which the P content or the sintering conditions are outside the scope of the present invention, have an inferior bearing performance with a higher frictional coefficient and a higher bearing temperature. The reference alloy bearing No. 16, which contains $MoS_2$ as the solid lubricant, but not P, showing a bearing performance comparable with that of the bearings of the present invention Nos. 1 to 9 under the condition II, has a lower bearing performance with a higher frictional coefficient and a higher bearing temperature under the condition I as compared with the bearings of the present invention Nos. 1 to 9. The reference alloy bearings Nos. 10 to 16 have a larger amount of bearing as compared with the bearings of the present invention Nos. 1 to 9. Particularly, the reference alloy bearings Nos. 10, 12, 13 and 16 with a lower strength, which contains a little or no P or have a lower sintering temperature than the scope of the present invention, the amount of wear under the condition I is very large. This wear occurs in the severe state of boundary lubrication immediately after startup before transferring to the stable state of hydrodynamic lubrication in the high-velocity region.

EXAMPLE 2

A Cu powder having a particle size of up to 147 μm, an Sn powder having a particle size of up to 44 μm, a Cu-P alloy (P-8.4% eutectic alloy) powder having a particle size of up to 44 μm, an $MoS_2$ powder having an average particle size of from 40 to 60 μm, a natural graphite powder having a particle size of up to 44 μm, a Cu-Zn alloy (Cu-30% Zn alloy) powder having a particle size of up to 50 μm, a carbonyl iron powder having a particle size of up to 10 μm, and a Pb powder having a particle size of up to 74 μm were blended and mixed so as to give the final chemical composition as shown in Table 5. The resultant powder mixture was pressed under a pressure of from 1 to 3 tons/cm² to form green compacts. The green compacts thus obtained were respectively sintered in a hydrogen atmosphere at a temperature of 720° C. for 30 minutes to prepare sintered alloys within the scope of the present invention (hereinafter referred to as "alloys of the present invention") Nos. 17 to 21, and sintered alloys outside the scope of the present invention (hereinafter referred to as "reference alloys") Nos. 22 to 24.

TABLE 5

| Alloy No. | | Chemical composition (wt. %) | | | | | | |
|---|---|---|---|---|---|---|---|---|
| | | Sn | MoS$_2$ | P | C | Zn | Fe | Pb | Cu and incidental impurities |
| Alloy | 17 | 10 | 6.6 | 0.8 | 0.5 | — | — | — | balance |
| of the | 18 | 10 | 6.6 | 0.8 | 0.5 | 2 | — | — | balance |
| present | 19 | 10 | 6.6 | 0.8 | 0.5 | — | 0.5 | — | balance |
| invention | 20 | 10 | 6.6 | 0.8 | 0.5 | 2 | 0.5 | 2 | balance |
| | 21 | 10 | 6.6 | 0.8 | 0.5 | 4 | 0.5 | 4 | balance |
| Reference | 22 | 10 | 6.6 | 0.8 | 2 | — | — | — | balance |
| | 23 | 10 | 6.6 | 0.8 | 0.5 | — | 2 | — | balance |
| alloy | 24 | 10 | 6.6 | 0.8 | 0.5 | 4 | 0.5 | 8 | balance |

Then, as in Example 1, density, oil content and radial crushing strength were respectively measured for each of the alloys of the present invention Nos. 17 to 21 and the reference alloys Nos. 22 to 24 shown in Table 5. The results of said measurement are given in Table 6.

TABLE 6

| Alloy No. | | Physical properties | | |
|---|---|---|---|---|
| | | Density (g/cm³) | Oil content (vol. %) | Radial crushing strength (kg/mm²) |
| Alloy | 17 | 6.39 | 24.8 | 25.0 |
| of the | 18 | 6.33 | 25.0 | 28.0 |
| present | 19 | 6.37 | 24.7 | 26.7 |
| invention | 20 | 6.38 | 25.0 | 26.9 |
| | 21 | 6.37 | 24.9 | 27.9 |
| Reference | 22 | 6.30 | 25.0 | 22.0 |
| | 23 | 6.38 | 24.8 | 25.2 |
| alloy | 24 | 6.40 | 22.0 | 21.8 |

Then, for the purpose of evaluating bearing performance for each of oil-impregnated bearings respectively prepared from the alloys of the present invention Nos. 17 to 21 and the reference alloys Nos. 22 to 24 shown in Table 5, oil-impregnated bearings Nos. 17 to 21 were prepared from the alloys of the present invention Nos. 17 to 21 (hereinafter referred to as "bearings of the present invention"), and oil-impregnated bearings Nos. 22 to 24 from the reference alloys Nos. 22 to 24 (hereinafter referred to as "reference alloy bearings"), as in Example 1. Then, also as in Example 1, the frictional coefficient, the bearing temperature and the amount of wear of the bearings were measured under the condition I and the condition II for each of the bearings of the present invention Nos. 17 to 21 and the reference alloy bearings Nos. 22 to 24. The results of said measurement are shown in Table 7.

TABLE 7

| Bearing No. | | Condition I | | | Condition II | | |
|---|---|---|---|---|---|---|---|
| | | Frictional coefficient (μ) | Bearing temp. (°C.) | Amount of wear (μm) | Frictional coefficient (μ) | Bearing temp. (°C.) | Amount of wear (μm) |
| Bear- | 17 | 0.05 | 43 | 3 | 0.09 | 38 | 2 |
| ing of | 18 | 0.06 | 45 | 2 | 0.09 | 38 | 1 |
| the | 19 | 0.06 | 45 | 2 | 0.09 | 38 | 1 |
| present | 20 | 0.05 | 43 | 2 | 0.09 | 35 | 1 |
| invention | 21 | 0.06 | 45 | 2 | 0.09 | 35 | 1 |
| Refer- | 22 | 0.11 | 80 | 5 | 0.09 | 35 | 3 |
| ence | 23 | 0.07 | 50 | 3 | 0.13 | 72 | 2 |
| alloy bearing | 24 | 0.07 | 50 | 7 | 0.18 | 90 | 4 |

As is evident from the comparison of the results of measurement given in Tables 6 to 7 with the results of measurement given in Tables 3 and 4, in the bearings of the present invention Nos. 17 to 21 added with C and at least one of Fe, Pb and Zn, there is observed almost no difference in the frictional coefficient and the bearing temperature from those of the bearings of the present invention Nos. 1 to 9 not containing these constituents, under the condition I (i.e., in the state of hydrodynamic lubrication in the low-load and high-velocity region), but under the condition II (i.e., in the state of boundary lubrication in the high-load and low-velocity region), show a superior bearing performance, with a lower frictional coefficient and a lower bearing temperature, to that of the bearings of the present invention Nos. 1 to 9 especially under the effect of addition of C. Furthermore, the bearings of the present invention Nos. 18 to 21 have an improved radial crushing strength and a smaller amount of wear as compared with the bearings of the present invention Nos. 1 to 9 under the effect of addition of Fe and/or Zn.

In contrast, the reference alloy bearing No. 22 of which the C content is higher than the scope of the present invention, while showing a bearing performance well comparable with that of the bearings of the present invention Nos. 17 to 21 under the condition II, has a very high frictional coefficient and a very high bearing temperature under the condition I, thus leading to an inferior bearing performance in the low-load and high-velocity region. The reference alloy bearing No. 23, of which the C content is within the scope of the present invention but the Fe content is higher than the scope of the present invention, is slightly high in the frictional coefficient and the bearing temperature under the condition I because of the presence of a large quantity of hard Fe particles on the sliding surface of the bearing, and has a very low bearing performance in the high-load and low-velocity region under the condition II. In the reference alloy bearing No. 24 having C, Zn and Fe contents within the scope of the present invention but a Pb content higher than the scope of the present invention, oil content and radial crushing strength tend to decrease and there is a large amount of wear of the bearing. Furthermore, in the reference alloy bearing No. 24, the frictional coefficient and the bearing temperature are very high and bearing performance in the high-load and low-velocity region is very low under the condition II, because of Pb adhering to the rotating shaft.

In the above-mentioned Example 2, cases with MoS$_2$ used as the solid lubricant were described, and similar results were obtained also in cases with WS$_2$ used as the solid lubricant.

According to the present invention, as described above in detail, it is possible to obtain a copper-tin type sintered alloy for an oil-impregnated bearing, having a high oil content and a high radial crushing strength, and excellent in bearing performance not only under ordinary service conditions, but also as a bearing used in a lower-load and higher-velocity region than ordinary service conditions, by adding phosphorus and a solid lubricant with strictly limited ranges to a conventional Cu-Sn type sintered alloy for an oil-impregnated bearing, and carrying out sintering under specified conditions, thus providing industrially useful effects. Application of the copper-tin type sintered alloy for an oil-impregnated bearing of the present invention for an electric cleaner is especially useful.

We claim:

1. A copper-tin type sintered alloy for an oil-impregnated bearing excellent in bearing performance particularly as a bearing used in low-load and high-velocity region, having a chemical composition consisting of, in weight percentage:

| Tin | from 8 to 11%; |
|---|---|
| Phosphorus | from 0.2 to 1.7%; | at least one solid lubricant, having an average particle size of from 20 to 80 μm, selected from the group consisting of:

| Molybdenum disulfide and | from 1.1 to 11%, |
|---|---|
| Tungsten disulfide | from 1.7 to 17%, | where,
the total amount of molybdenum disulfide and tungsten disulfide being up to 17%;
and
the balance copper and incidental impurities; and
said sintered alloy being prepared by sintering a green compact having said chemical composition at a temperature of from 650° to 750° C. for 10 to 30 minutes.

2. The sintered alloy as claimed in claim 1, also containing at least one element selected from the group consisting of, in weight percentage:

| | Graphite | from 0.2 to | 0.8%, |
|---|---|---|---|
| | Iron | from 0.1 to | 1%, |
| | Lead | from 0.5 to | 5%, |
| and | | | |
| | Zinc | from 0.5 to | 5%. |

3. The sintered alloy as claimed in any of claims 1 and 2, wherein said solid lubricant has an average particle size within the range of from 40 to 60 μm.

* * * * *